United States Patent [19]
Li

[11] Patent Number: 5,904,363
[45] Date of Patent: May 18, 1999

[54] TRICYCLE FOR CHILDREN

[76] Inventor: Hsing Li, 17 Yung Hsing Street, Taichung, Taiwan

[21] Appl. No.: 08/806,669

[22] Filed: Feb. 26, 1997

[51] Int. Cl.$^6$ .............................. B62K 9/02; B62K 15/00
[52] U.S. Cl. ............................ 280/282; 280/287; 280/62
[58] Field of Search .................................. 280/270, 282, 280/278, 287, 288.4, 304.3, 62

[56] References Cited

U.S. PATENT DOCUMENTS

| | | | |
|---|---|---|---|
| 4,103,921 | 8/1978 | Brooks et al. | 280/267 |
| 4,168,846 | 9/1979 | Carren | 280/278 |
| 4,458,529 | 7/1984 | Shamie et al. | 280/278 |
| 4,621,826 | 11/1986 | Ziegler, Jr. | 280/259 |
| 4,958,842 | 9/1990 | Chang | 280/282 |
| 5,551,719 | 9/1996 | Rettger, Jr. | 280/282 |

Primary Examiner—Anne Marie Boehler
Attorney, Agent, or Firm—Smith, Gambrell & Russell, LLP; Beveridge, DeGrandi, Weilacher & Young Intellectual Property Group

[57] ABSTRACT

A children's tricycle is composed of a front frame, a rear frame, and a connection rod for fastening detachably the front frame and the rear frame. The front end of the connection rod is detachably fastened with the front frame in conjunction with a fastening jacket. The connection rod is provided at the midsegment thereof with a plurality of fastening holes for fastening a seat in conjunction with a plurality of fastening bolts. The rear frame has a bracing body provided with a recessed portion in which the rear end of the connection rod is received.

4 Claims, 2 Drawing Sheets

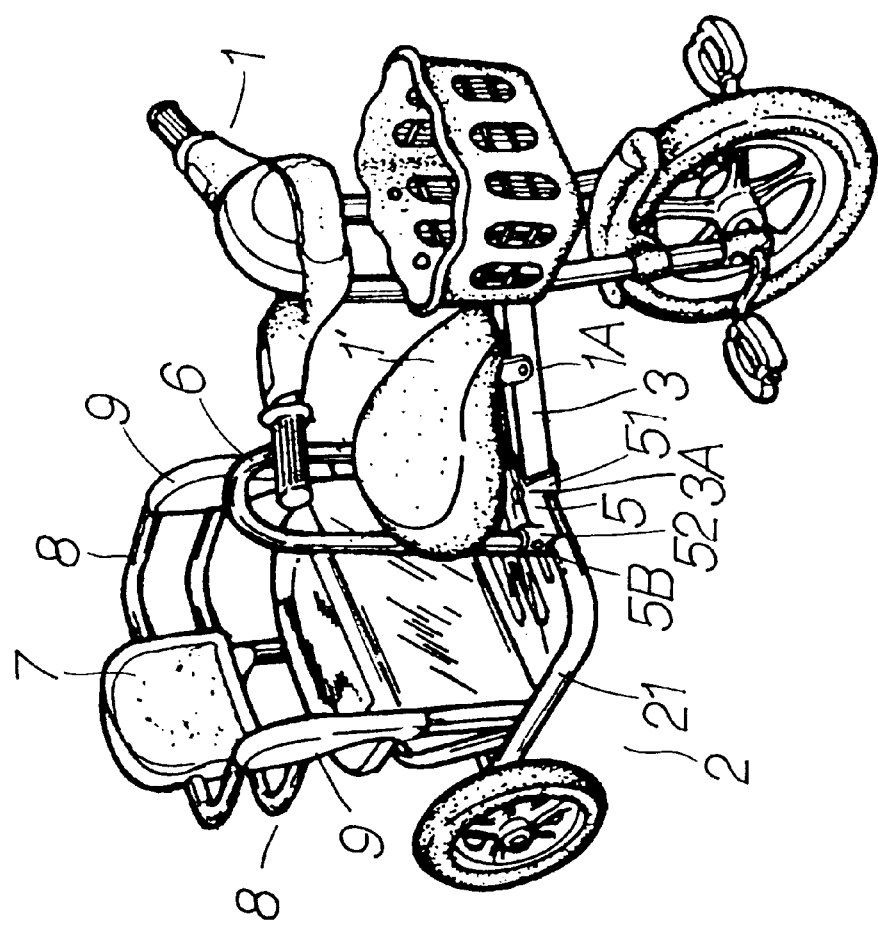

TRICYCLE FOR CHILDREN

FILED OF THE INVENTION

The present invention relates generally to a tricycle, and more particularly to a tricycle for children, which can be disassembled to facilitate the storage or shipment thereof.

BACKGROUND OF THE INVENTION

The conventional tricycle for children is generally assembled by welding and can not be therefore taken apart. It is conceivable that the conventional tricycle takes up a relatively large storage space, and that the conventional tricycle is rather vulnerable to damage in the course of transporting the tricycle from one place to another.

SUMMARY OF THE INVENTION

It is therefore the primary objective of the present invention to provide a tricycle for children, which can be disassembled and reassembled easily and rapidly to facilitate the storage and the shipment of the tricycle.

In keeping with the principle of the present invention, the foregoing objective of the present invention is attained by a tricycle which is intended for a child and is composed of a front frame, a rear frame, and a connection rod located between the front frame and rear frame. Both front frame and the rear frame are detachably fastened with the connection rod such that the tricycle can be taken apart easily and rapidly.

The foregoing objective, features, functions, and advantages of the present invention will be more readily understood upon a thoughtful deliberation of the following detailed description of a preferred embodiment of the present invention in conjunction with the accompanying drawings.

BRIEF DESCRIPTION OF THE DRAWINGS

FIG. 2 shows a perspective view of the present invention in combination.

DETAILED DESCRIPTION OF THE EMBODIMENT

Figure 1:
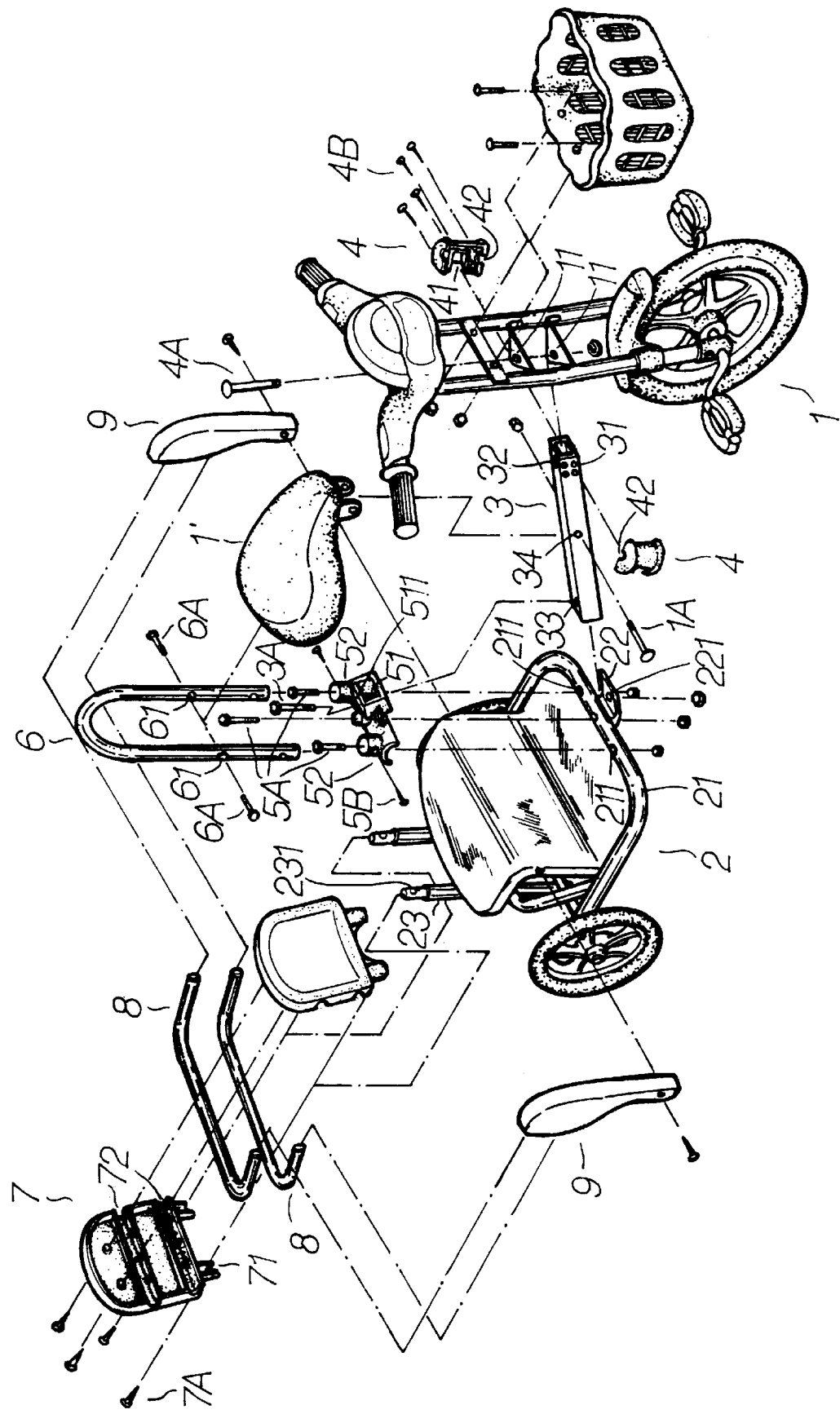
FIG. 1 shows an exploded view of the preferred embodiment of the present invention.

As shown in FIGS. 1 and 2, a children's tricycle embodied in the present invention is composed of a front frame 1, a rear frame 2, and a connection rod 3 fastened between the front frame 1 and the rear frame 2.

The front frame 1 comprises mainly two parallel stems which are fastened respectively at the top end thereof with the handlebar and at the bottom end thereof with a front wheel. The front frame 1 is provided with a plurality of pivoting holes 11.

The connection rod 3 is provided at the front end thereof with a plurality of horizontal through holes 31 and with one vertical through hole 32. The front end of the connection rod 3 is detachably fastened with the front frame 1 in conjunction with a fastening jacket 4 such that a pivot 4A is received in the pivoting holes 11 of the front frame 1, the vertical hole 32 of the connection rod 3, and two vertical holes 42 of the fastening jacket 4, and that the front end of the connection rod 3 is received in a hollow interior 41 of the fastening jacket, and further that the front end of the connection rod 3 is secured to the fastening jacket 4 by a plurality of fastening bolts 4B which are engaged with the horizontal holes 31 of the front end of the connection rod 3.

The connection rod 3 is provided at the midsegment thereof with two horizontal holes 34 for fastening a seat 1' by means of a fastening bolt 1A which is received in the horizontal holes 34 of the connection rod 3. The rear portion of the seat 1' is supported by a support frame 6 in conjunctions with a fastening bolt 6A which is received in two horizontal holes 61 of the support frame 6.

The rear frame 2 comprises a body 21 having two fastening holes 211 for mounting a bracing bocy 5 by means of two fastening bolts 5A which are engaged with the fastening holes 211 and the hollow projections 52 of the bracing body 5. The bracing body 5 is provided with a recessed portion 51 having a vertical through holes 511. The body 21 of the rear frame 2 further has a connection piece 22 having a through hole 221. The connection piece 22 is intended for fastening the rear end of the connection rod 3 with the rear frame 2 such that a fastening pin 3A is received in the vertical through hole 511 of the bracing body 5, the vertical through hole 33 of the rear end of the connection rod 3, and the through hole 221 of the connection piece 22. It must be noted here that the rear end portion of the connection rod 3 is received in the recessed portion 51 of the bracing body 5. Both ends of two arms of the U-shaped support frame 6 are provided respectively with a horizontal through hole while two hollow projections 52 of the bracing body 5 are provided respectively with a horizontal through hole. In other words, the support frame 6 is mounted on the bracing body 5 such that both ends of the two arms of the support frame 6 are fastened with the two hollow projections 52 of the bracing body 5 by a fastening bolt 5B which is received in the horizontal through holes of the hollow projections 52 of the bracing body 5 and both ends of the two arms of the support frame 6. The rear frame 2 still further comprises two locking rods 23 having a horizontal through hole 231 for mounting a backrest 7. The backrest 7 is provided with two connection holes 71 and two retaining grooves 72 capable of holding two curved guardrails 8.

It is therefore readily apparent that the component parts of the present invention are detachably fastened together without the use of the welding technique, and that the component parts of the present invention can be disassembled and reassembled easily and rapidly.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claims.

What is claimed is:

1. A tricycle comprising a front frame, a rear frame, and a connection rod for fastening detachably said front frame and said rear frame;

wherein said front frame is provided with at least one stem for fastening at a top end thereof with a handle and at a bottom end thereof with a front wheel, said stem of said front frame having a plurality of pivoting holes;

said connection rod is provided at one end thereof with a plurality of horizontal through holes and one vertical through hole and is fastened detachably at said one end with said front frame in conjunction with a fastening jacket such that a pivot is received in said pivoting holes of said front frame, said vertical through hole of said connection rod and two vertical holes of said fastening jacket, and further that said one end of said connection rod is secured to said fastening jacket by a plurality of fastening bolts which are engaged with said horizontal through holes of said one end of said connection rod, said connection rod further provided at a midsegment thereof with two horizontal holes for fastening a seat by a fastening bolt which is engaged with said horizontal holes of said connection rod, with said seat being supported by a support frame in conjunction with a fastening bolt which is received in two horizontal holes of said support frame; and said rear frame comprising a body and two rear wheels fastened with said body, said body having two fastening holes for mounting a bracing body by two fastening bolts which are engaged with said fastening holes and two hollow projections of said bracing body, said bracing body provided with a recessed portion having a vertical through hole, said body of said rear frame further having a connection piece which is provided with a through hole for fastening another end of said connection rod with said rear frame such that a fastening pin is put through said vertical through hole of said bracing body, said vertical through hole of said another end of said connection rod and said through hole of said connection piece.

2. The tricycle as defined in claim 1, wherein said connection rod has another end which is received in said recessed portion of said bracing body of said rear frame.

3. The tricycle as defined in claim 1, wherein said support frame is of a U-shaped construction and is composed of two arms; and wherein said support frame is mounted on said bracing body of said rear frame such that said two arms of said support frame are fastened with said two hollow projections of said bracing body.

4. The tricycle as defined in claim 1, wherein said rear frame further comprises two locking rods having horizontal through holes for mounting a backrest in conjunction with said seat, said backrest Provided with a plurality of retaining grooves capable of holding a plurality of guardrails; and wherein said body of said rear frame is provided with two retaining pieces for securing said guardrails.

* * * * *